United States Patent [19]

Libbey

[11] 3,927,060

[45] Dec. 16, 1975

[54] METHOD OF PRODUCING DIETHYLDIFLUOROSILANE

[75] Inventor: William J. Libbey, Ponca City, Okla.

[73] Assignee: Continental Oil Company, Ponca City, Okla.

[22] Filed: Feb. 10, 1975

[21] Appl. No.: 548,859

Related U.S. Application Data

[63] Continuation-in-part of Ser. No. 431,190, Jan. 7, 1974, abandoned, which is a continuation of Ser. No. 235,003, March 15, 1972, abandoned.

[52] U.S. Cl. .................. 260/448.2 E; 260/448.8 R
[51] Int. Cl.² ....................... C07F 7/08; C07F 7/12
[58] Field of Search ............................. 260/448.2 E

[56] References Cited
UNITED STATES PATENTS

| | | | |
|---|---|---|---|
| 2,895,977 | 7/1959 | Fitch | 260/448.2 E |
| 2,921,951 | 1/1960 | Jenkner | 260/448.2 E |
| 3,466,270 | 9/1969 | Cook | 260/448.2 E X |
| 3,499,020 | 3/1970 | Robinson | 260/448.2 E |
| 3,621,045 | 11/1971 | Muller et al. | 260/448.2 E |

FOREIGN PATENTS OR APPLICATIONS

| | | | |
|---|---|---|---|
| 948,975 | 9/1956 | Germany | 260/448.2 E |
| 972,855 | 10/1959 | Germany | 260/448.2 E |
| 756,612 | 9/1956 | United Kingdom | 260/448.2 E |

*Primary Examiner*—Paul F. Shaver

[57] ABSTRACT

Diethyldifluorosilane is produced by the reaction of $SiF_4$ with an triethyl complex, the molar ratio of $SiF_4$ and aluminum triethyl content in the complex being in the range of 0.5/1 to 1.6/1 and wherein said aluminum triethyl complex is formed by the reaction of from about 0.4 to 3 moles of a complexing agent per mole of aluminum triethyl.

5 Claims, No Drawings

METHOD OF PRODUCING DIETHYLDIFLUOROSILANE

This is a continuation-in-part of Ser. No. 431,190, filed Jan. 7, 1974, now abandoned which in turn was a continuation of Ser. No. 235,003, filed Mar. 15, 1972, now abandoned.

This invention relates to a method for producing diethyldifluorosilane.

Organo-silicon halides, for example methyl silicon chlorides, have been manufactured commercially by the use of Grignard reagents, or elemental silicon plus alkyl chlorides in the presence of a copper catalyst. These processes have several disadvantages particularly with regard to the economics of the use of catalyst and reagents. Other methods have been proposed for the production of organic silicon compounds such as disclosed in British Pat. No. 756,612 wherein $Al(C_2H_5)_3$ is reacted with a compound containing silicon and fluorine wherein the fluorine atom is directly bonded to the silicon atom. In such a process the product formed has been reported to contain a mixture of the alkyltrifluorosilane compound, the dialkyldifluorosilane compound, the trialkylfluorosilane compound, and the tetraalkylsilane compound.

With specific regard to diethyldifluorosilane produced by synthetic procedures involving aluminum triethyl, problems have been encountered in achieving high yields at good selectivity. Diethyldifluorosilane, of course, upon hydrolysis and condensation, yields a silicone product useful as a lubricant and/or water repellent and other well-known utilities.

According to this invention a process has been found wherein diethyldifluorosilane can be produced synthetically in high yields while substantially maintaining or increasing the selectivity. Broadly, this is accomplished by reacting $SiF_4$ with an aluminum triethyl complex wherein the aluminum triethyl complex is formed by the reaction of a complexing agent with aluminum triethyl. The reaction conditions can vary broadly both as to temperature and pressure. However, desirable results have been obtained when the reaction is carried out at a temperature in the range of from about 190° to 300°C, preferably from about 210° to 250°C. Employing temperatures much below about 190°C results in slower reaction rates such that the reaction becomes impractical. Temperatures above 300°C may be used provided that degradation is avoided. Pressures are also not critical in the process, practicality being the primary consideration. In general, pressures in the range of almost atmospheric to about 3000 psi may be used, preferably 100 to about 1000 psi.

Because of the reactants involved in the abovedescribed reaction, as well as the product desired, the reaction must be carried out in the absence of moisture and oxygen or the yield of the desired product, as well as the selectivity for the product by the reaction, will be seriously affected. Thus, it has been found advantageous to carry out the reaction in an anhydrous inert atmosphere, employing inert gases such as argon, nitrogen, and the like.

In carrying out the process the molar ratio of $SiF_4$ to the aluminum triethyl component of the complex should generally be in the range of from about 0.5:1 to about 1.6:1. Desirable results have been obtained wherein the molar ratio of $SiF_4$ to the aluminum triethyl component of the complex is in the range of from about 1:1 to 1.5:1.

Diethyldifluorosilane can readily be produced by admixing $SiF_4$ with an aluminum triethyl complex and subjecting them to the reaction conditions set forth hereinbefore for a period of time effective to produce said diethyldifluorosilane. While the time factor for the reaction can vary widely and will be dependent to some extent on the temperature and pressures at which the reaction takes place desirable results have been obtained wherein the reaction period ranges from about 1 to 10 hours, preferably about 2 to 8 hours. Further, the temperature of the reaction can be adjusted upwardly in increments during this period of time to allow one more control over the reaction.

The aluminum triethyl complex used in the process is formed by the addition of a complexing agent to aluminum triethyl. The resulting reaction is an exothermic reaction and for safety reasons the complexing agent is added to the aluminum triethyl while same is maintained at substantially room temperature by employing constant agitation and an ice bath or other effective cooling means. Further, as is evident to those skilled in the aluminum alkyls art the reaction is carried out in an anhydrous, oxygen free atmosphere.

The amount of complexing agent added to the aluminum triethyl to form the aluminum triethyl complex can vary widely. Desirable results have, however, been obtained where the amount of complexing agent employed varies in a molar ratio with the aluminum triethyl from about 0.4:1 to 3:1, respectively. Especially desirable results have been obtained wherein the molar ratio of the complexing agent to the aluminum triethyl is about 1:1.

Any suitable complexing agent which does not interfere in the production of diethyldifluorosilane by the reaction of the aluminum triethyl with $SiF_4$, as previously described, can be employed. In general, the suitable complexing agents include tetrahydrofuran; m-dioxane; p-dioxane; triethylenediamine; quinoline; isoquinoline; aliphatic amines of the formula

wherein each R is a straight chain alkyl group having 1 to 6 carbon atoms;
and cyclic amines of the formula

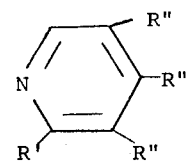

wherein R′ is hydrogen or methyl, and each R″ is hydrogen or an alkyl group having 1 to 10 carbon atoms provided that any two adjacent R″ groups together with the nuclear carbon atoms to which they are attached may represent a single ring having 5 to 7 carbon atoms.

It should be noted that when employing more than 30 g. of complexed aluminum trialkyl, extreme care should be taken to avoid a sudden rise in temperature and pressure. For example, utilizing a reactor with a rupture disc, heating slowly and gradually stirring sufficiently, and maintaining good heat-transfer control should avoid the above-mentioned problems when more than 30 g. of complexed aluminum trialkyl is employed in the process of the present invention.

In order to more fully describe the present invention the following examples are given. However, it is to be understood that these examples are for illustrative purposes only and are not intended to unduly limit the scope of the present invention. In each example the percentages are weight percentages unless otherwise specified.

EXAMPLE 1

A 100-ml stainless steel autoclave was charged with 20.83 g. of a 1:1 molar complex of aluminum triethyl and pyridine and 15.6 g. of $SiF_4$. The autoclave was then heated with stirring for 1 hour at 125°C, 1.5 hours at 145°C, 2.0 hours at 170°C, 1.0 hour at 200°C, 1.0 hour at 220°C, and 1.5 hours at 230°C. The liquid distillate plus ethyltrifluorosilane gas weighed 20 g. and upon analysis was found to have (GC - peak areas):

| | |
|---|---|
| Ethyltrifluorosilane | 10% |
| Diethyldifluorosilane | 71% |
| Triethylfluorosilane | 1.7% |
| Tetraethylsilane | 0% |
| Pyridine | 9.8% |
| Others | 6.5% |

EXAMPLE 2

A 100-ml stainless steel autoclave was charged with 16.9 g. of a 1:1 molar complex of aluminum triethyl and pyridine and 13.0 g. of $SiF_4$. The autoclave was then heated with stirring for 1 hour at 125°C, 2 hours at 145°C, 1.5 hours at 170°C, and 1.5 hours at 200°C. The alkylfluorosilane product had the following composition (peak areas on glpc) and weighed 11.4 g:

| | |
|---|---|
| Ethyltrifluorosilane | 66.8% |
| Diethyldifluorosilane | 28.9% |
| Triethylfluorosilane | 1.6% |
| Others | 2.7% |

This experiment while being conducted with the same mole ratios as Example 1 employed a lower maximum temperature (200° versus 230°) and illustrates the desirability of employing a higher maximum temperature.

EXAMPLE 3

A 100-ml stainless steel autoclave was charged with 9.07 g. of aluminum triethyl and 16.1 g. of $SiF_4$. The autoclave was heated with stirring for 1 hour at 125°C, 3 hours at 170°C, and 2 hours at 225°C. The alkylfluorosilane product had the following composition (peak areas on glpc) and weighed 10.7 g:

| | |
|---|---|
| Ethylfluorosilane | 63.4% |
| Diethyldifluorosilane | 24.6% |
| Triethyldifluorosilane | 4.3% |
| Tetraethylsilane | 6.5% |
| Others | 1.3% |

This experiment, while employing substantially the same procedure as that of Example 1, except that an aluminum triethyl complex was not employed, illustrates the importance of the aluminum triethyl complex if one is to produce the desired diethyldifluorosilane.

EXAMPLE 4

The invention is further demonstrated by employing the procedure of Example 1 but employing a 2:1 molar complex of tetrahydrofuran and aluminum triethyl and achieving similar results.

EXAMPLE 5

Further, the invention is demonstrated by a series of experiments each employing the procedure of Example 1 but employing a 3:1 molar complex of a specified complexing agent and aluminum triethyl with similar results. The complexing agents for employment are isoquinoline, triethylamine, tributylamine, trihexylamine, diethylbutylamine, m-dioxane, p-dioxane, 2-methylpyridine, 4-methylpyridine, 2-methyl-4-butylpyridine, 3,5-dioctylpyridine, 2-methyl-5-butylpyridine, and triethylenediamine.

Thus, having described the invention in detail it will be understood by those skilled in the art that certain variations and modifications may be made without departing from the spirit and scope of the invention as defined herein and in the appended claims.

I claim:

1. A method for producing diethyldifluorosilane comprising
   a. forming a reaction mixture of $SiF_4$ and an aluminum triethyl complex, said reaction mixture having a molar ratio of $SiF_4$ to aluminum triethyl content in the complex in the range of 0.5–1.6/1, said aluminum triethyl complex being derived from the addition of a complexing agent to aluminum triethyl in a molar ratio of 0.4–3/1, respectively, said complexing agent being tetrahydrofuran; m-dioxane, p-dioxane; triethylenediamine; quinoline; isoquinoline; aliphatic amines of the formula

wherein each R is a straight chain alkyl group having 1 to 6 carbon atoms; and cyclic amines of the formula

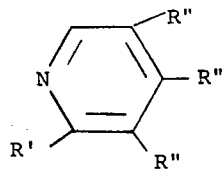

wherein R' is hydrogen or methyl, and each R'' is hydrogen or an alkyl group having 1 to 10 carbon atoms provided that any two adjacent R'' groups together with the nuclear carbon atoms to which they are attached may represent a single ring having 5 to 7 carbon atoms; and
   b. subjecting the reaction mixture to reaction at temperatures in the range of 190°–300°C, under a substantially anhydrous, oxygen-free atmosphere, at pressures of up to 3000 psi, with agitation to produce diethyldifluorosilane.

2. The method of claim 1 wherein said reaction is carried out at a temperature in the range of from about 210° to about 250°C.

3. The method of claim 1 wherein said complexing agent is tetrahydrofuran, pyridine, m-dioxane, p-dioxane, isoquinoline, triethylenediamine, or triethylamine.

4. The method of claim 3 wherein said complexing agent is present in about a 1:1 molar ratio with said aluminum triethyl and said complexing agent is pyridine or isoquinoline.

5. The method of claim 4 wherein said aluminum triethyl complex is an aluminum triethyl/pyridine complex and said $SiF_4$ and aluminum triethyl content in the complex are present in a molar ratio of from about 1:1 to about 1.5:1.

* * * * *